United States Patent
Wong et al.

(10) Patent No.: US 8,090,031 B2
(45) Date of Patent: Jan. 3, 2012

(54) METHOD FOR MOTION COMPENSATION

(75) Inventors: Hoi Ming Wong, Hong Kong (HK); Yan Jenny Huo, Hong Kong (HK)

(73) Assignee: Hong Kong Applied Science and Technology Research Institute Company Limited, New Territories (HK)

( * ) Notice: Subject to any disclaimer, the term of this patent is extended or adjusted under 35 U.S.C. 154(b) by 1123 days.

(21) Appl. No.: 11/867,836

(22) Filed: Oct. 5, 2007

(65) Prior Publication Data

US 2009/0092328 A1 Apr. 9, 2009

(51) Int. Cl.
*H04N 7/12* (2006.01)

(52) U.S. Cl. ............... 375/240.29; 375/240.18; 382/154; 382/299; 382/285; 382/266; 382/300; 348/407.1; 348/51

(58) Field of Classification Search .......... None
See application file for complete search history.

(56) References Cited

U.S. PATENT DOCUMENTS

| | | | |
|---|---|---|---|
| 2003/0169931 A1 | 9/2003 | Lainema | |
| 2004/0076333 A1 | 4/2004 | Zhang | |
| 2005/0105617 A1 | 5/2005 | Chono | 375/240.16 |
| 2005/0157936 A1 | 7/2005 | Sato et al. | 382/286 |
| 2006/0033936 A1* | 2/2006 | Lee et al. | 358/1.2 |
| 2006/0294171 A1 | 12/2006 | Bossen et al. | 708/300 |
| 2007/0086520 A1* | 4/2007 | Kim | 375/240.1 |
| 2008/0075165 A1* | 3/2008 | Ugur et al. | 375/240.12 |
| 2008/0084491 A1* | 4/2008 | He et al. | 348/333.13 |

FOREIGN PATENT DOCUMENTS

| | | |
|---|---|---|
| CN | 1620821 A | 5/2005 |
| CN | 1625902 A | 6/2005 |
| WO | WO 2006/108654 | 10/2006 |
| WO | WO 2007/009875 | 1/2007 |

OTHER PUBLICATIONS

International Search Report dated Jan. 3, 2008.

* cited by examiner

*Primary Examiner* — Kibrom T Hailu
(74) *Attorney, Agent, or Firm* — Ella Cheong Hong Kong; Margaret A. Burke; Sam T. Yip (57) ABSTRACT

A method for use in video compression is disclosed. In particular, the claimed invention relates to a method of more efficient fractional-pixel interpolation in two steps by a fixed filter (240) and an adaptive filter (250) for fractional-pixel motion compensation.

11 Claims, 7 Drawing Sheets

METHOD FOR MOTION COMPENSATION

RELATED APPLICATION

There are no related applications.

TECHNICAL FIELD

The claimed invention relates to a method for video compression. In particular, the claimed invention relates to a method for removing temporal redundancy between video frames by motion compensation.

BACKGROUND ART

Video compression addresses the problem of reducing the amount of data required to represent video and a number of standards have been available for implementation. The video coding standards in use today can be grouped into two broad categories according to their intended applications: (i) video teleconferencing standards such as H.261 and H.264 which have been defined by the International Telecommunications Union (ITU) and (ii) multimedia standards such as MPEG-2, MPEG-4 which are developed under the auspices of the Motion Picture Experts Group of the CCITT and ISO.

Despite the existence of a variety of video coding standards, most rely on similar video compression techniques. These techniques include the still image compression techniques due to the fact that video is made up of a series of still images known as frames (or fields). For example, predictive coding techniques such as DPCM (Differential Pulse Code Modulation) which is a spatial domain method, and DCT (Discrete Cosine Transform) which is a transform coding making use of a reversible, linear transform to map the image into a set of transform coefficients. The coefficients are then quantized and coded.

Besides reducing the spatial redundancy, these video compression techniques also make use of motion estimation and motion compensation in order to reduce temporal redundancies. Moving objects in video often appear from frame (or field, both terms can be used interchangeably for simplicity hereinafter) to frame with all or part of it relocated in those subsequent frames. Despite those relocations, correlation among the sequence of frames is high and gives rise to redundancy. This so-called temporal redundancy can be reduced by comparing and relating the pixel in the present frame to the location of the same object in the preceding reference frame.

For example, the PCT international patent application with publication number WO 2006/108654 A2 published on 19 Oct. 2006 in the name of Universität Hannover describes "Method and Apparatus for Enhanced Video Coding"; the U.S. patent application with publication number US 2003/0169931 A1 published on 11 Sep. 2003 in the name of Jani Lainema describes "Coding Dynamic Filters"; the U.S. patent application with publication number US 2004/0076333 A1 published on 22 Apr. 2004 in the name of Huipin Zhang and Frank Bossen describes "Adaptive Interpolation Filter System for Motion Compensated Predictive Video Coding"; the PCT international patent application with publication number WO 2007/009875 A2 published on 25 Jan. 2007 in the name of Thomson Licensing describes "Method and Apparatus for Encoding Video Data, and Video Signal Obtained from said Method or Apparatus"; and the U.S. patent application with publication number US 2006/0294171 A1 published on 28 Dec. 2006 in the name of Frank Bossen and Alexandros Tourapis describes "Method and Apparatus for Video Coding and Decoding using Adaptive Interpolation".

SUMMARY OF THE INVENTION

For motion compensation where much of the data required in coding can be eliminated by comparing the present pixel to the location of the same object in the previous frame, an encoder is used to estimate the motion of object in the image in order to find the corresponding area in a previous frame. If moving objects in a video have non-integer pixel displacement between frames, motion vectors telling the decoder what portion of the previous frame for predicting the new frame will have fractional values instead of integer values. In order to cope with this sort of fractional-pixel motion, it is required to interpolate fractional pixels (hereinafter referred to as subpixels) before combining with the residue to reconstitute the current frame.

Until now, the interpolation is carried out either by solely a fixed filter or by solely an adaptive filter. Fixed filters are symmetric and cannot capture any small motion offset between video frames. The bandwidth of a fixed filter is fixed, inhibiting it from being adaptive to various video signals such as textured, noisy or smooth ones. For the case of solely using an adaptive filter for interpolation, the complexity will be very high as a lot of costly multiplications are required, for example, each subpixel requires 36 multiplications if 36-tap filter is to interpolate each subpixel from 36 integer pixels.

Therefore, the claimed invention is related to interpolating fractional pixels by using a combination of fixed filter and adaptive filter to generate fractional-pixel images. The filters in use are not restricted to be symmetrical and the sum of the filter coefficient values of the interpolation filter are not fixed which is good for fading video. Fewer multiplications are required in the claimed invention, lowering the complexity of the interpolation with comparable and even better performance in term of video signal quality. The reference pixels used by the disclosed adaptive filter are chosen from a set of subpixels, which are interpolated from a set of fixed filters. Furthermore, the claimed invention provides a coding method adopted by the video encoder for the adaptive filter coefficient in which the adaptive filter coefficients are predicted from standard, upper or left filter such that to reduce the data required to be sent to the video decoder. The disclosed coding of filter coefficients are no longer limited by any predefined filter. A set of disclosed adaptive filter pattern and coefficients can be sent per frame, per field, or per number of macroblocks.

BRIEF DESCRIPTION OF THE DRAWINGS

These and other objects, aspects and embodiments of the claimed invention will be described in more detail with reference to the following drawings, in which:

DETAILED DESCRIPTION OF THE INVENTION

Figure 1:
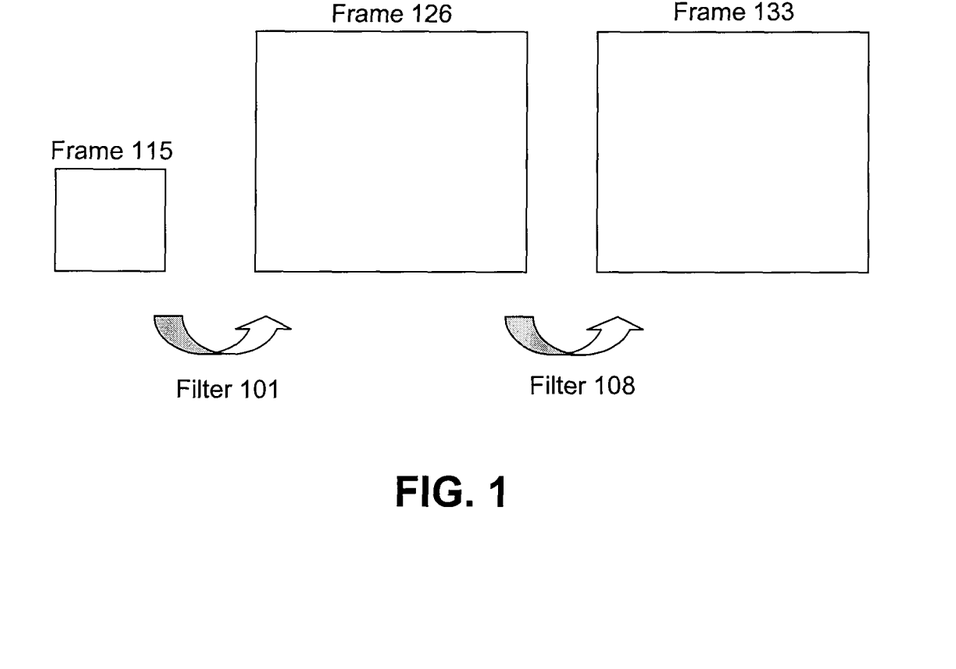
FIG. 1 shows a schematic diagram of a 2-step interpolation for an embodiment of the claimed invention.

One embodiment of the claimed invention is to carry out the interpolation of a video frame for motion compensation in two steps as shown in FIG. 1. For interlaced scanning, each image in a video is made up of 2 fields. But for progressive scanning, each image is referred to be a frame. Therefore, these 3 terms: image, field and frame represent a still image in a video—a screenshot at a particular instance and can be used interchangeably throughout this disclosure. As shown in FIG. 1, after passing through filter 101, the resolution of frame 115 will be increased to that of frame 126 up to subpixel level as an intermediate subpixel image. Then frame 126 is further processed by filter 108 to obtain the desired output frame 133 as a reference subpixel image but this time the resolution remains the same as frame 126.

Figure 2:
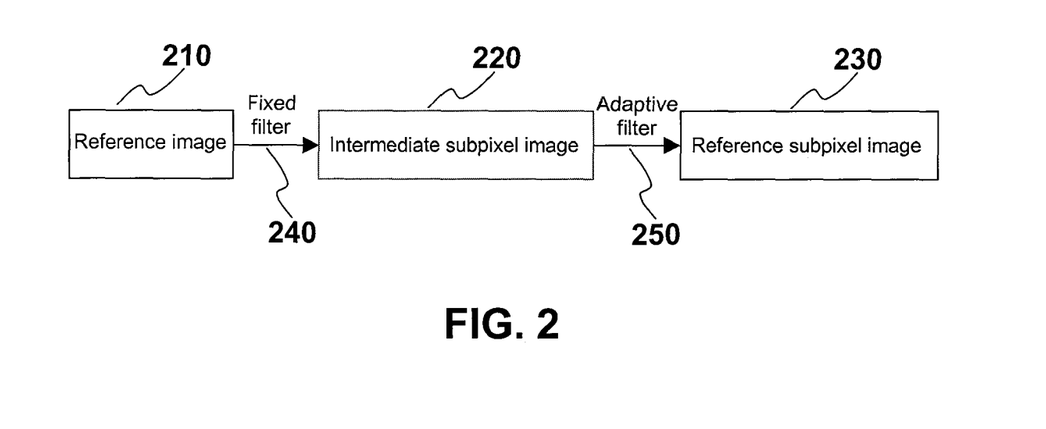
FIG. 2 shows a process of using intermediate subpixel value (interpolated by fixed filter) to interpolate final subpixel value for an embodiment of the claimed invention.

According to the claimed invention, FIG. 2 further illustrates that in the 2-step filtering process, the first filter in use is a fixed filter 240 and the second filter is an adaptive filter 250. The fixed filter 240 is applied on a reference image 210 which is an image previously received by the decoder (not shown). After the interpolation by the fixed filter 240, an intermediate subpixel image 220 is generated which is then fed into the adaptive filter 250 to produce the reference subpixel image 230 from which the current image is reconstituted by arranging the pixels of the reference subpixel image 230 according to the estimated motion and adding the residue image (not shown) which is the prediction error for the current image.

Figure 3:
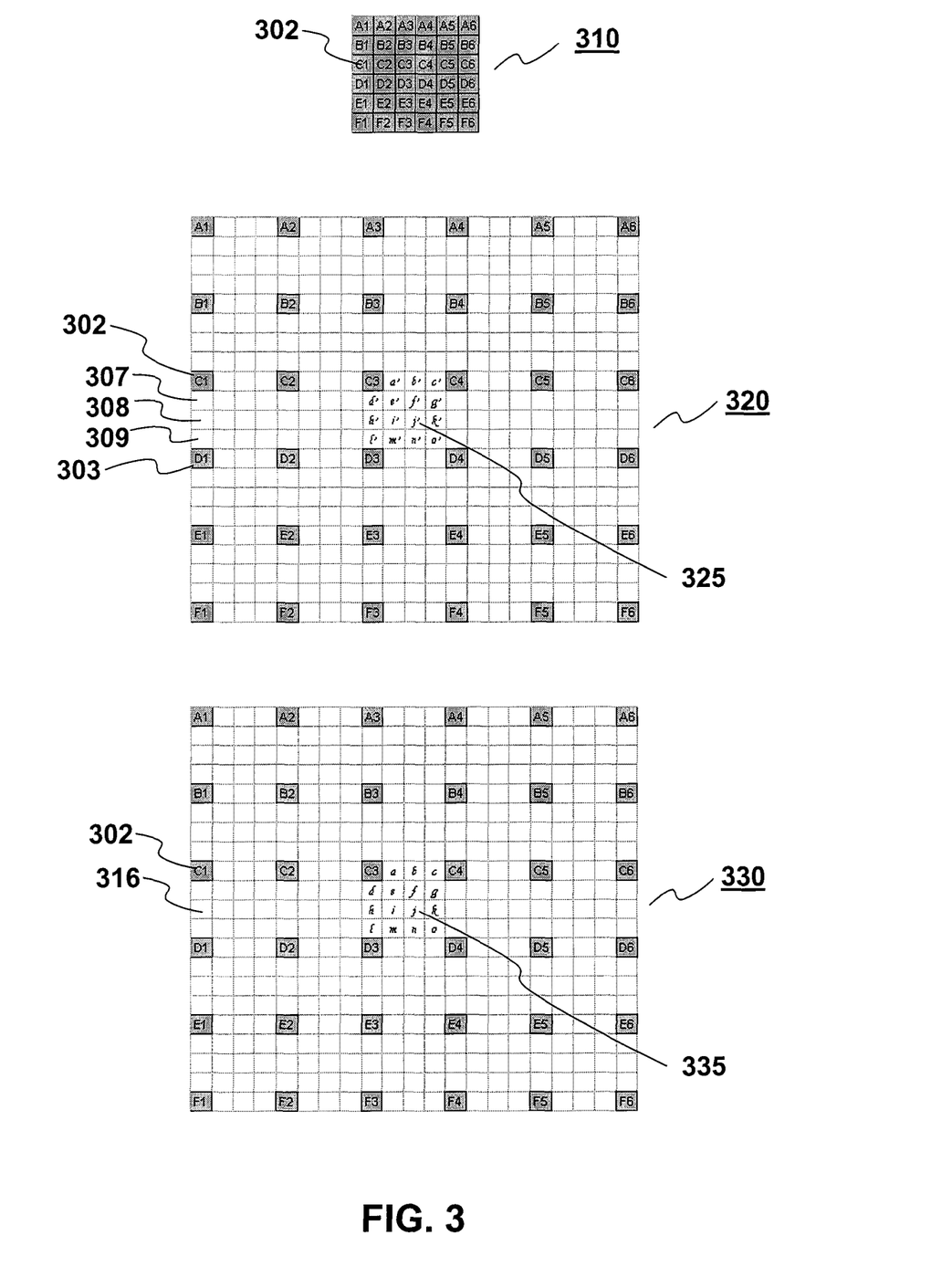
FIG. 3 shows the reference image portion, intermediate subpixel image portion and reference subpixel image portion in a video frame.

According to one embodiment in this claimed invention, the image is divided into a number of blocks which can be of any size such as 2×2, 4×4, 8×8, 16×16 pixels for processing. For the sake of clear explanation of the claimed invention, only a portion of the image (6×6 pixels in size for an embodiment of the claimed invention) is used for exemplary illustration (hereafter referred as image portion) and the image portions are shown in FIG. 3. Therefore, when reconstituting the current image from the reference image, the reference image is manipulated in a portion by portion manner. Each image portion 310 from the reference image will then be fed into the fixed filter to build the intermediate subpixel image which is made up of image portions 320. The interpolation is continued by applying the adaptive filter on portions 320 to output the reference subpixel image which is made up of image portions 330.

Interpolation is to pad subpixels in between each existing pixel. The value of each subpixel can be determined by those of existing pixels. The more subpixels are padded in between those existing pixels, the higher the precision of the fractional-pixel movement can be described. For example, if a moving object moves only half a pixel in a video, it is required to use at least half-pixel interpolation in which each existing pixel will become one pixel apart from its adjacent horizontal neighbors and from its adjacent vertical neighbors. Therefore, the half-pixel movement can be more accurately modeled by moving a "half step" to the interpolated subpixel in-between the existing pixels instead of a "full step" to the next existing pixel. The precision of the fractional-pixel movement which can be catered for by the claimed invention can be up to any degree such as half pixel, quarter pixel, one-tenth pixel, etc. depending on how many subpixels are interpolated.

In the embodiment illustrated in FIG. 3, interpolation up to quarter-pixel level is considered. Reference image portion 310 contains 6×6 pixels known as reference pixels 302. Each of these reference pixels are named from A to F according to which rows they are in and numbered sequentially from 1 to 6 according to which columns they are in. After the interpolation by the fixed filter, the intermediate subpixel image portion 320 is formed. Intermediate subpixels such as intermediate subpixel 308 are padded around each reference pixel 302. Now that all reference pixels such as reference pixel 302 are 3-pixel apart from each other in term of vertical and horizontally distance. Therefore, vertically and horizontally speaking, 3 intermediate subpixels such as intermediate subpixels 307, 308, 309 are filled in between those reference subpixels such as between subpixels 302 and 303. In other words, each reference pixel 302 has been interpolated into a size of 4×4 pixels in which the reference pixel 302 is located at the top left-hand corner in this 4×4 pixel area and the rest of the area will be filled by 15 intermediate subpixels 308. Then based on these intermediate subpixels 308 and the reference pixels 302, the adaptive filter is used to generate reference subpixels 316 as in the reference subpixel image portion 330 where there is no further padding of subpixels and the size of the reference subpixel image portion 330 remains the same as that of the intermediate subpixel image portion 320.

In the claimed invention, the interpolation is carried out in two steps but previously it is done in one operation. The following will illustrate how the two-step interpolation is performed to achieve better prediction by combining fixed filter and adaptive filter with less taps and thus reduce the complexity of computation and implementation of the interpolation significantly.

In general, the more taps in the filter applied such as adaptive filter, the higher accuracy will be for the prediction. Unlike interpolation with fixed filter coefficients which can be computed by combinations of shifting and adding, adaptive filter coefficients must be computed by multiplications. For example, one may use an adaptive filter with 36 taps to interpolate each subpixel from a 6×6 image portion, i.e. 36 reference pixels:

$$SP = \{h(0) \cdot A1 + h(1) \cdot A2 + \ldots + h(34) \cdot F5 + h(35) \cdot F6\} \quad (1)$$

where SP is the value for a reference subpixel 316, h(i) are the adaptive filter coefficients and A1, A2 ... B1 ... F6 are the value of those reference pixels in the reference image portion 310.

This 36-tap filter needs 36 multiplication and the cost is very high as multiplication itself is costly. For System-on-Chip (SoC) implementation, the area for a multiplier is approximately 10 times of that of the area for a shifter and the speed of a multiplier is much lower, i.e. comparable to a tenth of the speed of a shifter. Therefore, the claimed invention uses intermediate subpixel value (interpolated by fixed filter) to obtain final subpixel value (interpolated by adaptive filter with a few number of taps), providing much lower complexity. As such, a smaller size of adaptive filter is required for the same interpolation performance.

In one embodiment of the claimed invention, one embodiment for the fixed filter 240 can be the H.264 filter and which is used to compute the intermediate subpixel values spi'. Take the example of the values for the intermediate subpixels a', b', c', d', e', f', g', h', i', j', k', l', m', n', o' in intermediate subpixel image portion 320 in FIG. 3, the H.264 half-pixel interpolation filter will be used to compute the intermediate subpixel values spi' for intermediate subpixels b', h' and j' with 6 fixed taps: [1, −5, 20, 20, −5, 1]/32. The computation is done by the following equations:

$$b'=(C1-5*C2+20*C3+20*C4-5*C5+C6+16)/32 \quad (2)$$

$$h'=(A3-5*B3+20*C3+20*D3-5*E3+F3+16)/32 \quad (3)$$

$$j'=(Ab'-5*Bb'+20*b'+20*Db'-5*Eb'+Fb'+16)/32 \quad (4)$$

Figure 4:
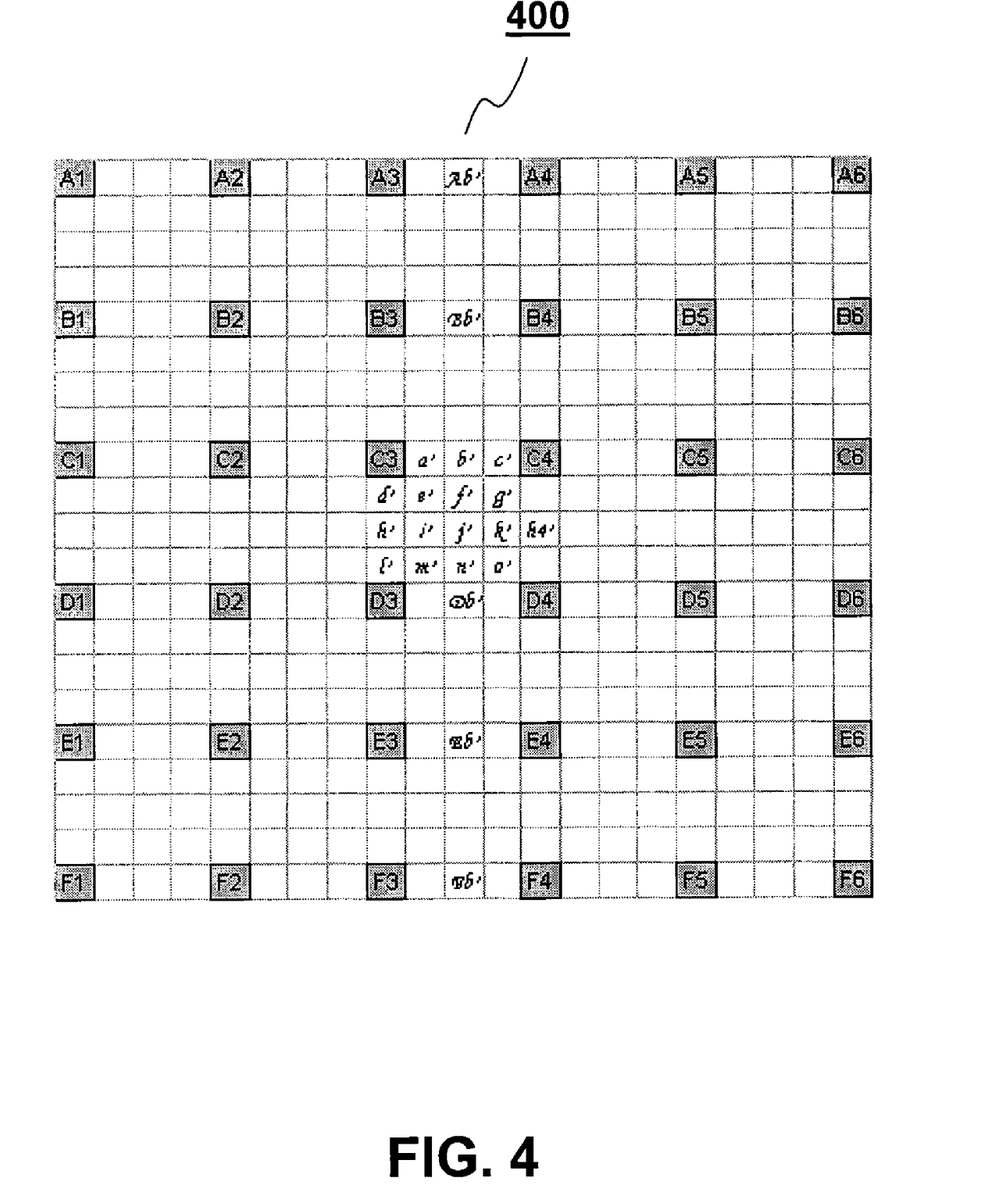
FIG. 4 shows the intermediate subpixel image portion with pixels required in the construction of interpolation filters for an embodiment of the claimed invention.

And the arrangement of the pixel/subpixel value used in the equations 2 to 4 has been depicted in FIG. 4. Then the intermediate subpixel values spi' for intermediate subpixels a', c', d', e', f', g', h', i', k', l', m', n', o' will be computed by the H.264 quarter-pixel interpolation filter which is a bilinear one with filter coefficients of: [1, 1]/2. The computation is done by the following equations with respect to the subpixel values at subpixel locations as shown in image portion 400 in FIG. 4:

$$a'=(C3+b'+1)/2 \quad (5)$$

$$c'=(b'+c'+1)/2; \quad (6)$$

$$d'=(C3+h'+1)/2; \quad (7)$$

$$e'=(b'+h'+1)/2; \quad (8)$$

$$f'=(b'+j'+1)/2; \quad (9)$$

$$g'=(b'+h4'+1)/2; \quad (10)$$

$$i'=(h'+j'+1)/2; \quad (11)$$

$$k'=(j'+h4'+1)/2; \quad (12)$$

$$l'=(h'+D3+1)/2; \quad (13)$$

$$m'=(h'+Db'+1)/2; \quad (14)$$

$$n'=(j'+Db'+1)/2; \quad (15)$$

$$o'=(h4'+Db'+1)/2; \quad (16)$$

Only shifters and adders are required for implementing the aforesaid H.264 fixed filter and it is just one of the many examples for the fixed filter. Any other fixed filter which can be implemented by shifters and adders can be chosen as the fixed filter.

While for the adaptive filter, there is no restriction to its configuration which can be in any geometric pattern such as diamond or square and the number of taps can be chosen freely. However, it is better to have fewer taps to reduce the costly multiplications. Moreover, filter coefficients for adaptive filter can be determined by a variety of methods during the coding stage such as the one used in VCEG Z-17. In one embodiment of the claimed invention, diamond pattern is adopted and the values for each reference subpixel 316 can be computed by the following equation where 5 taps are required:

$$SP=\{h(0){\cdot}sp0'+h(1){\cdot}sp1'+h(2){\cdot}sp2'+h(3){\cdot}sp3'+h(4){\cdot}sp4'\} \quad (17)$$

where SP is the reference subpixel value, h(i) are the filter coefficient and spi' are the intermediate subpixel values obtained from interpolating by fixed filter Equation 17 can be written as:

$$SP = \{h(0)\cdot\left(\sum H_0(i,j)P_0(i,j)\right) + h(1)\cdot \\ \left(\sum H_1(i,j)P_1(i,j)\right) + h(2)\cdot\left(\sum H_2(i,j)P_2(i,j)\right) + h(3)\cdot \\ \left(\sum H_3(i,j)P_3(i,j)\right) + h(4)\cdot\left(\sum H_4(i,j)P_4(i,j)\right)\} \quad (18)$$

where $H_i$ are fixed filters and $P_i$ are reference pixels

As an embodiment for the claimed invention, the optimal filter coefficients for the adaptive filter 250 can be obtained by solving the following Sum of Squared Error (SSE) equation for the whole frame:

$$(e^{SP})^2 = \sum_x \sum_y \left(S_{x,y} - \sum_i \sum_j h_{i,j}^{SP} P_{\tilde{x}+i,\tilde{y}+j}\right)^2 \quad (19)$$

where $(e^{SP})^2$ is the SSE, $S_{x,y}$ is an original image, $P_{x,y}$ is a previously decoded image, i, j are the filter indices and $$\sum_i \sum_j h_{i,j}^{SP} P_{\tilde{x}+i,\tilde{y}+j}$$

The derivatives is then taken from both sides:

$$0 = \frac{(\partial e^{SP})}{\partial h_{k,l}^{SP}} \quad (20)$$

$$= \frac{\partial}{\partial h_{k,l}^{SP}}\left(\sum_x \sum_y \left(S_{x,y} - \sum_i \sum_j h_{i,j}^{SP} P_{\tilde{x}+i,\tilde{y}+j}\right)^2\right)$$

$$= \sum_x \sum_y \left(S_{x,y} - \sum_i \sum_j h_{i,j}^{SP} P_{\tilde{x}+i,\tilde{y}+j}\right) P_{\tilde{x}+i,\tilde{y}+l}$$

$$\forall k, l \in \{0; 5\}$$

Figure 5:
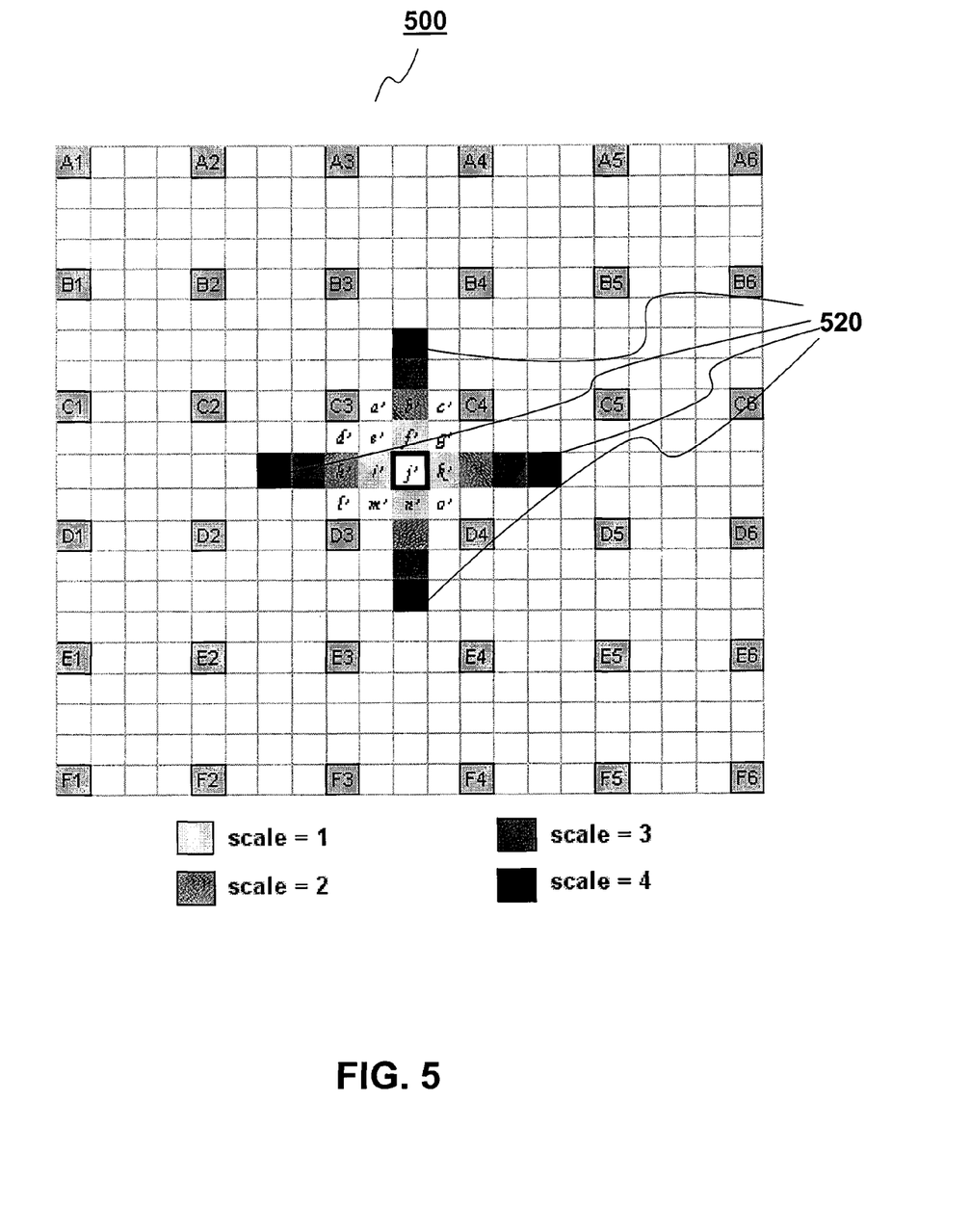
FIG. 5 shows the interpolation of a video frame by a scalable filter for an embodiment of the claimed invention.

In a raster scan, the reference subpixel values SP are determined for each reference subpixel in the order of a, b, c, d, e, f, g, h, i, j, k, l, m, n in the reference image portion 330 as shown in FIG. 3. To minimize the SSE, a scalable adaptive filter is used in the disclosed embodiment. In FIG. 5, an intermediate subpixel image portion 500 is shown and the intermediate subpixels in different grayscale represent different filter scales. In one embodiment of the claimed invention, the scale is selected from 1 to 6, the number of taps for the adaptive filter is 5 and the filter pattern is diamond. For example, in order to determine the value for the reference pixel j (not shown in FIG. 5) in the reference subpixel image portion 330, five corresponding intermediate subpixels pixels in the neighborhood of pixel j including the intermediate subpixel value of j' will be required. In a diamond pattern, only pixels along the same row or the same column as where the pixel under interpolation are considered. For the case where scale is equal to 1, the intermediate subpixels used for interpolation includes, f', i', j', k', n' and f', i', k', n' are directly adjacent to j'. The larger the scale is, the further the pixels apart from the pixel under interpolation are taken into consideration. When scale equals to 4, far-away intermediate subpixels 520 are being considered, they are black in colors as shown in FIG. 5. Each of these far-away intermediate subpixels 520 are either vertically or horizontally 3 pixels apart from the intermediate subpixel j'. Both the value of the 5 taps of coefficients and the value of the scale will be fed into the decoder when determining the value for the reference subpixel j.

For the adaptive filter used in the embodiment of the claimed invention, there are 5 coefficient taps as shown in equation 17. Since the interpolation enlarge each reference pixel into a size of 4×4 pixels where values for 15 subpixels are required to be determined through equation 17. The total number of coefficients will then be 75 and if they are coded in 16-bit integers, it will take 1200 bits per slice to store the coefficients. These coefficients may further be predicted and entropy coded in order to reduce the cost.

Figure 6:
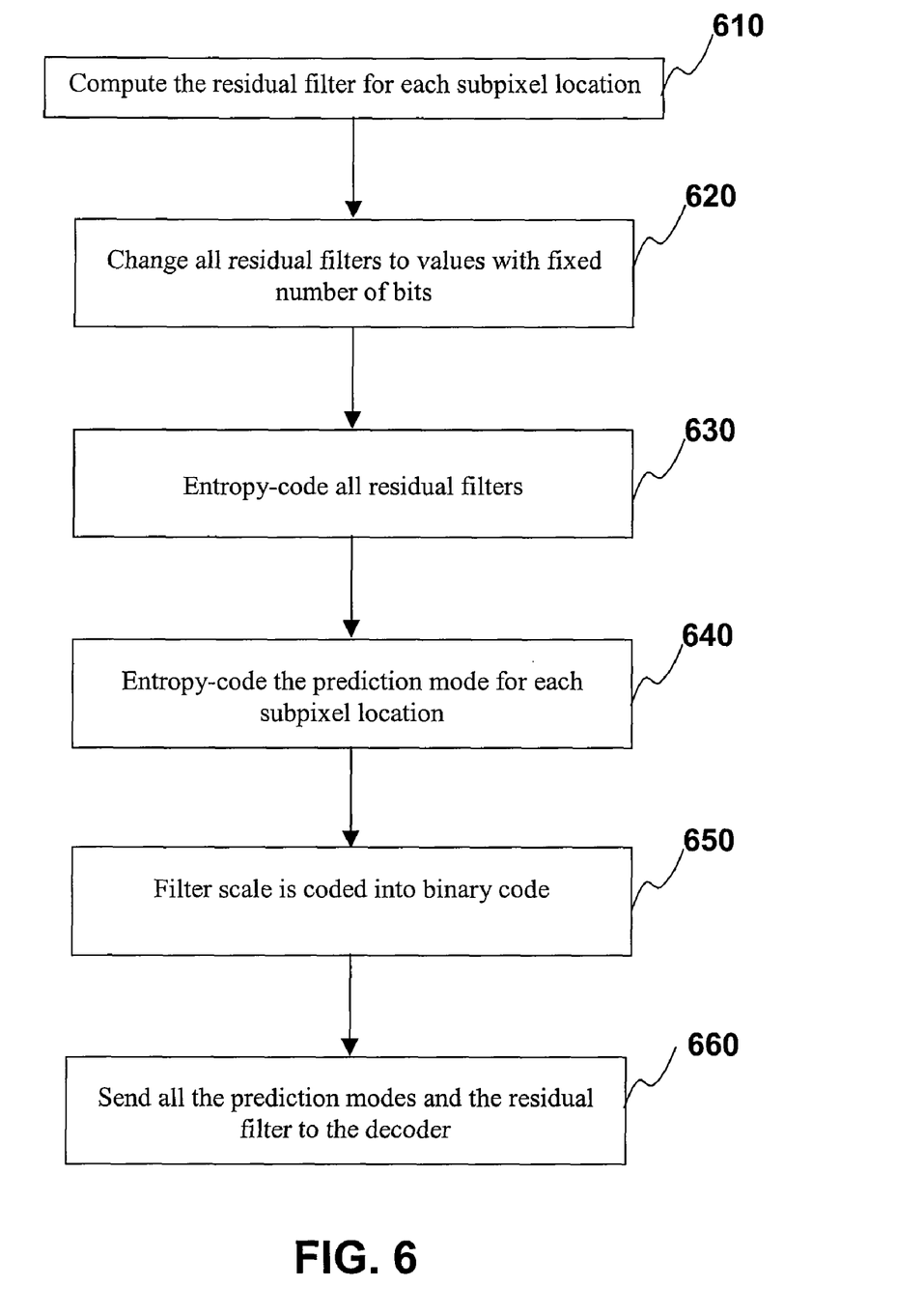
FIG. 6 shows a flow chart for filter coefficient coding.

Filter coefficients can be predicted from the corresponding coefficients of neighboring subpixels. However, in the claimed invention, the correlation between filter coefficients is much smaller and the following coding method needs to be used instead of any symmetrical assumption. FIG. 6 shows the steps for the prediction of filter coefficients. The filter coefficient for a portion is predicted and coded before being sent to the decoder. First of all, it is required to obtain the residual filter (Filter_residual) for each subpixel location as in residual filter determination step 610. Assuming the adaptive filter 250 in use has N taps, N can be any integer such as 5, the adaptive filter for each subpixel in a portion will also have N taps.

The rule for computing the residual filters is: Each of the adaptive filter coefficients for all subpixel locations can be predicted from upper subpixel location (if available), left subpixel location (if available), or standard filter coefficients (std_filter), indicated by 1 to 2 bits. The standard filter is a pre-defined (constant) filter for the whole video sequence and an example for the standard filter coefficients can be {1,0,0, 0,0} and all operations between filters are tap-tap operations. In the case if upper or left subpixel is available, the N-tap residual filter at a particular subpixel location is the argument which can minimize the value of the Sum of Squared Error (SSE) between the filter at subpixel location and its corresponding resconstructed filters. In the case if there is no upper or left subpixel available, the residual filter can be determined by a subtraction of the standard filter from the filter at subpixel location.

Figure 7:
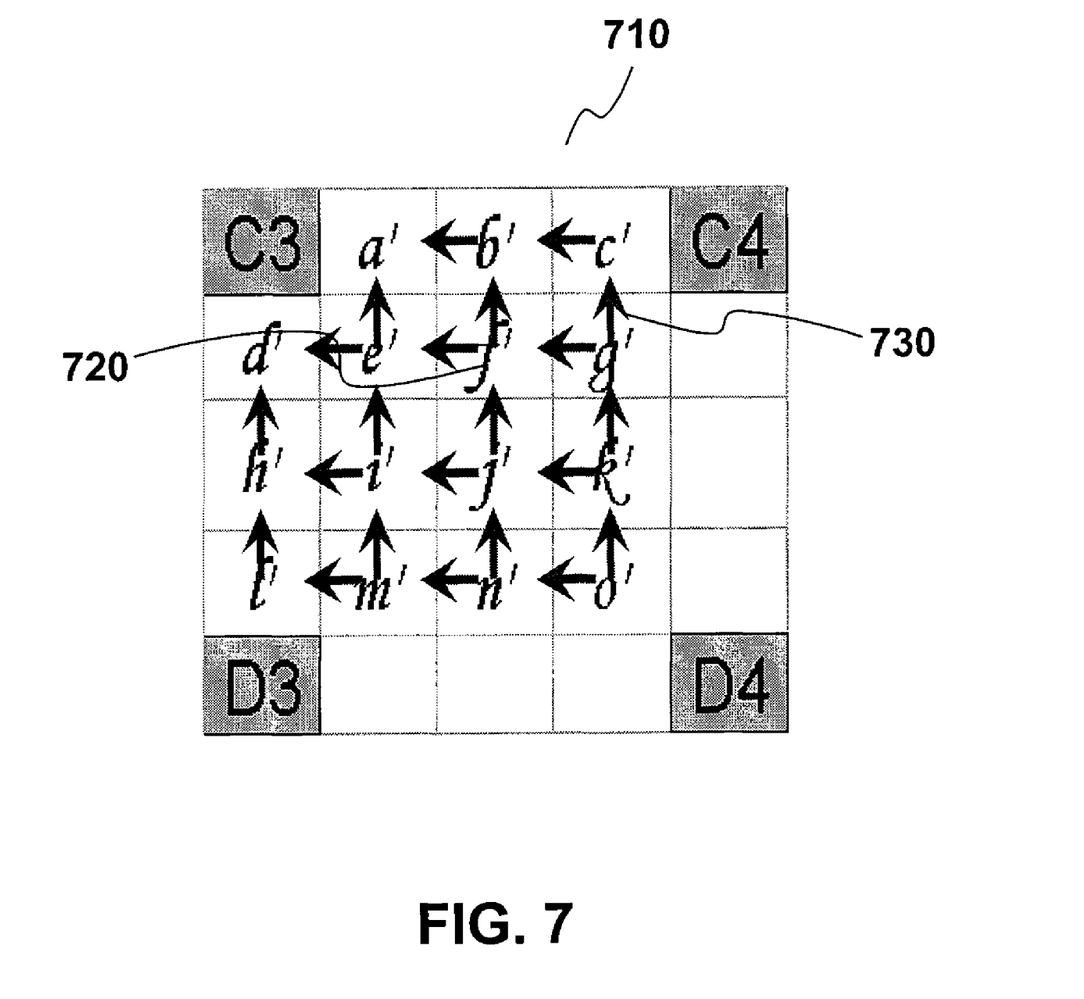
FIG. 7 shows prediction modes available for coding filter coefficients at each subpixel location.

As shown in FIG. 7, the arrows such as arrow 730 represent how the filter at each subpixel location such as filter 720 depends on the reconstructed filter (not shown in FIG. 7). For example, subpixel filter at f' (filter_f') is related to the reconstructed filters at subpixels b' (filter_br') and e' (filter_er'). The equations are given as follows:

Filter_residual(i') is the residual filter at subpixel location i, filter_i' is the filter at subpixel location i, filter_ir' is the reconstructed filter at subpixel location i, std_filter is the standard filter.

$$\text{Filter\_residual}(a') = \text{filter\_}a' - \text{std\_filter} \tag{21}$$

$$\text{Filter\_residual}(b') = \arg\min(\text{SSE}(\text{filter\_}b' - \text{filter\_}ar'), \text{SSE}(\text{filter\_}b' - \text{std\_filter})) \tag{22}$$

$$\text{Filter\_residual}(c') = \arg\min(\text{SSE}(\text{filter\_}c' - \text{filter\_}br'), \text{SSE}(\text{filter\_}b' - \text{std\_filter})) \tag{23}$$

$$\text{Filter\_residual}(d') = \text{filter\_}d' - \text{std\_filter} \tag{24}$$

$$\text{Filter\_residual}(e') = \arg\min(\text{SSE}(\text{filter\_}e' - \text{filter\_}ar'), \text{SSE}(\text{filter\_}e' - \text{filter\_}dr'), \text{SSE}(\text{filter\_}e' - \text{std\_filter})) \tag{25}$$

$$\text{Filter\_residual}(f') = \arg\min(\text{SSE}(\text{filter\_}f' - \text{filter\_}er'), \text{SSE}(\text{filter\_}f' - \text{filter\_}br'), \text{SSE}(\text{filter\_}f' - \text{std\_filter})) \tag{26}$$

$$\text{Filter\_residual}(g') = \arg\min(\text{SSE}(\text{filter\_}g' - \text{filter\_}cr'), \text{SSE}(\text{filter\_}g' - \text{filter\_}fr'), \text{SSE}(\text{filter\_}g' - \text{std\_filter})) \tag{27}$$

$$\text{Filter\_residual}(h') = \arg\min(\text{SSE}(\text{filter\_filter\_}h' - \text{filter\_}dr'), \text{SSE}(\text{filter\_}h' - \text{filter\_std\_filter})) \tag{28}$$

$$\text{Filter\_residual}(i') = \arg\min(\text{SSE}(\text{filter\_}i' - \text{filter\_}er'), \text{SSE}(\text{filter\_}i' - \text{filter\_}hr'), \text{SSE}(\text{filter\_}i' - \text{std\_filter})) \tag{29}$$

$$\text{Filter\_residuals}(j') = \arg\min(\text{SSE}(\text{filter\_}j' - \text{filter\_}fr'), \text{SSE}(\text{filter\_}j' - \text{filter\_}ir'), \text{SSE}(\text{filter\_}j' - \text{std\_filter})) \tag{30}$$

$$\text{Filter\_residual}(k') = \arg\min(\text{SSE}(\text{filter\_}k' - \text{filter\_}gr'), \text{SSE}(\text{filter\_}k' - \text{filter\_}jr'), \text{SSE}(\text{filter\_}k' - \text{std\_filter})) \tag{31}$$

$$\text{Filter\_residual}(l') = \arg\min(\text{SSE}(\text{filter\_}l' - \text{filter\_}hr'), \text{SSE}(\text{filter\_}l' - \text{std\_filter})); \text{Filter\_residual}(m') = \arg\min(\text{SSE}(\text{filter\_}m' - \text{filter\_}ir'), \text{SSE}(\text{filter\_}m' - \text{filter\_}lr'), \text{SSE}(\text{filter\_}m' - \text{std\_filter})) \tag{32}$$

$$\text{Filter\_residual}(n') = \arg\min(\text{SSE}(\text{filter\_}n' - \text{filter\_}jr'), \text{SSE}(n' - \text{filter\_}mr'), \text{SSE}(\text{filter\_}n' - \text{std\_filter})) \tag{33}$$

$$\text{Filter\_residual}(o') = \arg\min(\text{SSE}(\text{filter\_}o' - \text{filter\_}kr'), \text{SSE}(\text{filter\_}o' - \text{filter\_}nr'), \text{SSE}(\text{filter\_}o' - \text{std\_filter})) \tag{34}$$

All the filter coefficients are subsequently truncated to values with fixed number of bits, for example 10 bits, in the filter coefficient truncation step 620 as shown in FIG. 6. All residual filters for all subpixels are entropy-coded by existing coding schemes such as Exp-Golumb code in the residual-filter coding step 630. The entropy coding in use can be variable length coding or arithmetic coding such as CABAC (Context-based Adaptive Binary Arithmetic Coding). The prediction mode for each subpixel location is also entropy-coded in the prediction-mode coding step 640. For example, if SSE(filter_e'−filter_ar') is the minimum, then the prediction mode will be "upper". This will be indicated by 1-2 bits. The filter scale is also coded into binary code in the filter scale coding step 650. Finally, all coded residual filters and the coded prediction modes are sent to the decoder in the decoder communication step 650.

In one embodiment of 5-tap adaptive filter, 600-1200 bits are spent on average on filter coefficients per slice after using the aforesaid coding method.

Figure 8:
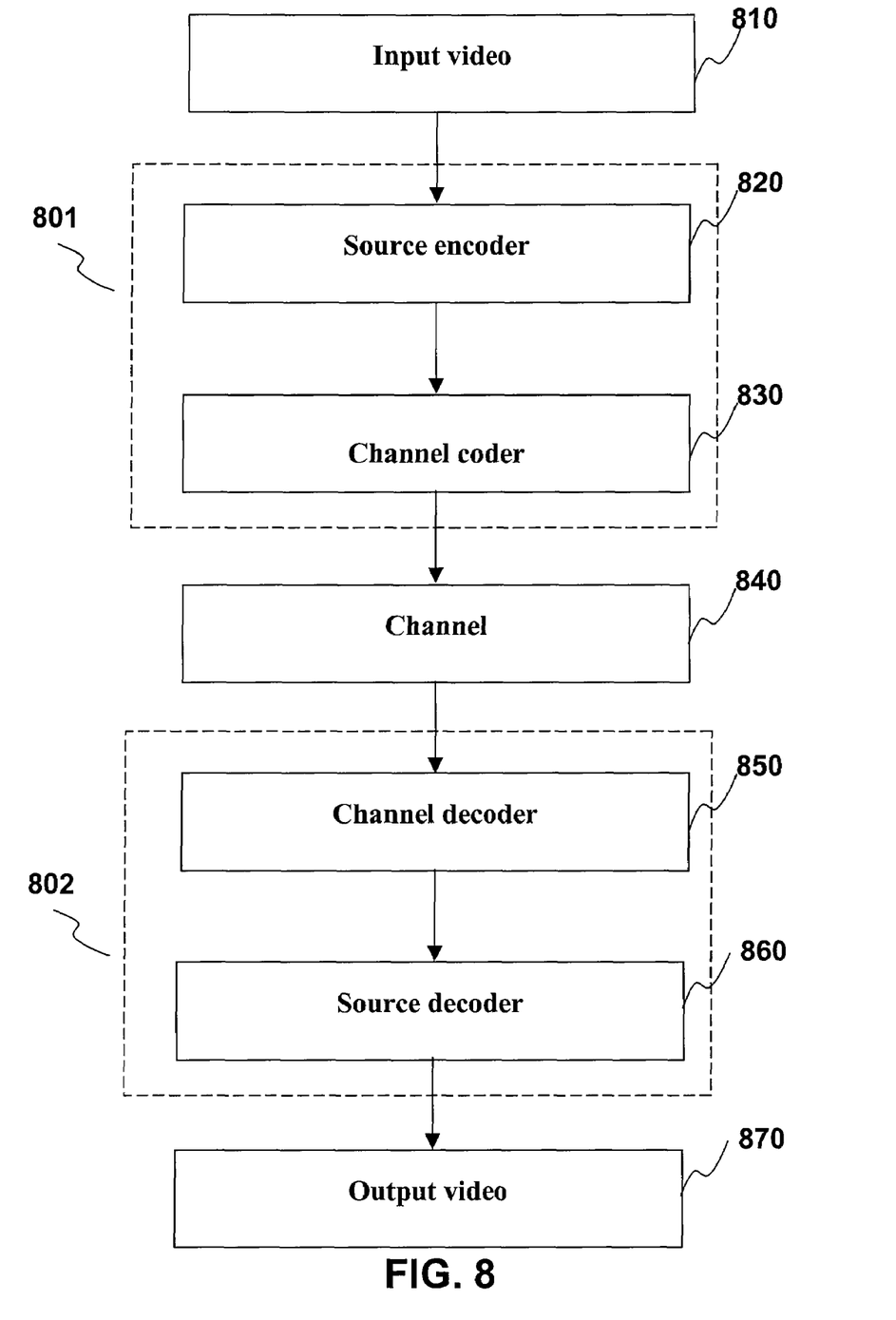
FIG. 8 shows a general video compression system model where the disclosed invention can be applied.

FIG. 8 shows a general video compression model where the disclosed invention can be applied. The input video 810 is encoded before sending to the receiver over the channel 840. The encoding is carried out by the source encoder 820 and channel encoder 830. The source encoder 820 and channel encoder 830 are together regarded as encoder 801. After reaching the receiver side through the channel 840, the compressed video will be decoded by the channel decoder 805 and the source decoder 806 to generate the output video 807. The channel decoder 805 and the source decoder 806 together can be regarded as decoder 802. The interpolation method as described by the claimed invention is applied in encoding at the encoder 801 as well as decoding at the decoder 802. The filter coefficients used in the interpolation can be coded at encoder 801 before sending to the decoder 802 in a way described in one embodiment of the claimed invention.

The description of preferred embodiments of the claimed invention are not exhaustive and any update or modifications to them are obvious to those skilled in the art, and therefore reference is made to the appending claims for determining the scope of the claimed invention.

INDUSTRIAL APPLICABILITY

The disclosed method and related device have industrial applicability in the video industry. The disclosed method and related device can find applications in the following: Cable TV (CATV) on optical networks, copper, etc.; Direct broadcast satellite (DBS) video services; Digital subscriber line (DSL) video services; Digital terrestrial television broadcasting (DTTB); Interactive storage media (ISM) such as optical disks, etc.; Multimedia mailing (MMM); Multimedia services over packet networks (MSPN); Real-time conversational (RTC) services such as videoconferencing, videophone, etc.; Remote video surveillance (RVS); Serial storage media (SSM) such as digital video tape recorder (DVTR), and others.

We claim:

1. A method for video processing for motion compensation comprising the steps of:
    interpolating a source video image by a first filtering step to generate an intermediate video image; and
    processing the intermediate video image by a second filtering step to construct a reference image;
    wherein said second filtering step is performed by a five-tab adaptive filter;
    wherein asymmetrical filter coefficients of said adaptive filter are processed by filter coefficient coding;
    wherein said filter coefficient coding additionally comprises the steps of:
        computing a residual filter for a subpixel location to determine one or more residual filter coefficients with values of a corresponding upper subpixel location reconstructed filter if available, a corresponding left subpixel location reconstructed filter if available, and a standard filter coefficient;
        truncating said one or more residual filter coefficients to coefficient values with fixed number of bits;
        entropy-coding said residual filter;
        coding a filter scale; and
        entropy-coding a prediction mode for said subpixel location.

2. The method according to claim 1, wherein said first filtering step is performed by a fixed filter.

3. The method according to claim 2, wherein said fixed filter is selected from a group of fixed filters consisting of H.264 filters, linear filters and bilinear filters.

4. The method according to claim 1, wherein said adaptive filter is a scalable adaptive filter.

5. The method according to claim 1, wherein said adaptive filter has a geometric filter pattern.

6. The method according to claim 1, wherein said entropy-coding is selected from a group of coding methods consisting of variable-length coding, arithmetic coding and CABAC.

7. The method according to claim 1, wherein said step of entropy-coding of said prediction mode further comprises the step of: determining whether said filter coefficients are calculated from one or more subpixel locations.

8. The method according to claim 1, wherein said step of entropy-coding of said prediction mode further comprises the step of: determining whether said filter coefficients are calculated from standard filter coefficients.

9. An interpolation method for fractional-pixel motion compensation comprising steps of:
    fixed filtering a source video image to generate an intermediate video image of desired resolution as a fractional-pixel image;
    five-tab adaptive filtering a video image the intermediate video image to provide reference image and coding a plurality of asymmetrical coefficients implemented by said adaptive filtering.
    wherein said coding of a plurality of asymmetrical coefficients additionally comprises the steps of:
        computing a residual filter for a subpixel location to determine one or more residual filter coefficients with values of a corresponding upper subpixel location reconstructed filter if available, a corresponding left subpixel location reconstructed filter if available, and a standard filter coefficient;
        truncating said one or more residual filter coefficients to coefficient values with fixed number of bits;
        entropy-coding said residual filter;
        coding a filter scale; and
        entropy-coding a prediction mode for said subpixel location.

10. The method according to claim 9, wherein said step of entropy-coding of said prediction mode further comprises the step of: determining whether said filter coefficients are calculated from one or more subpixel locations.

11. The method according to claim 9, wherein said step of entropy-coding of said prediction mode further comprises the step of: determining whether said filter coefficients are calculated from standard filter coefficients.

* * * * *